Aug. 2, 1960      W. P. SLOTA      2,947,440
SECTIONAL CONTAINERS AND THE LIKE
Filed Oct. 2, 1957      2 Sheets-Sheet 1
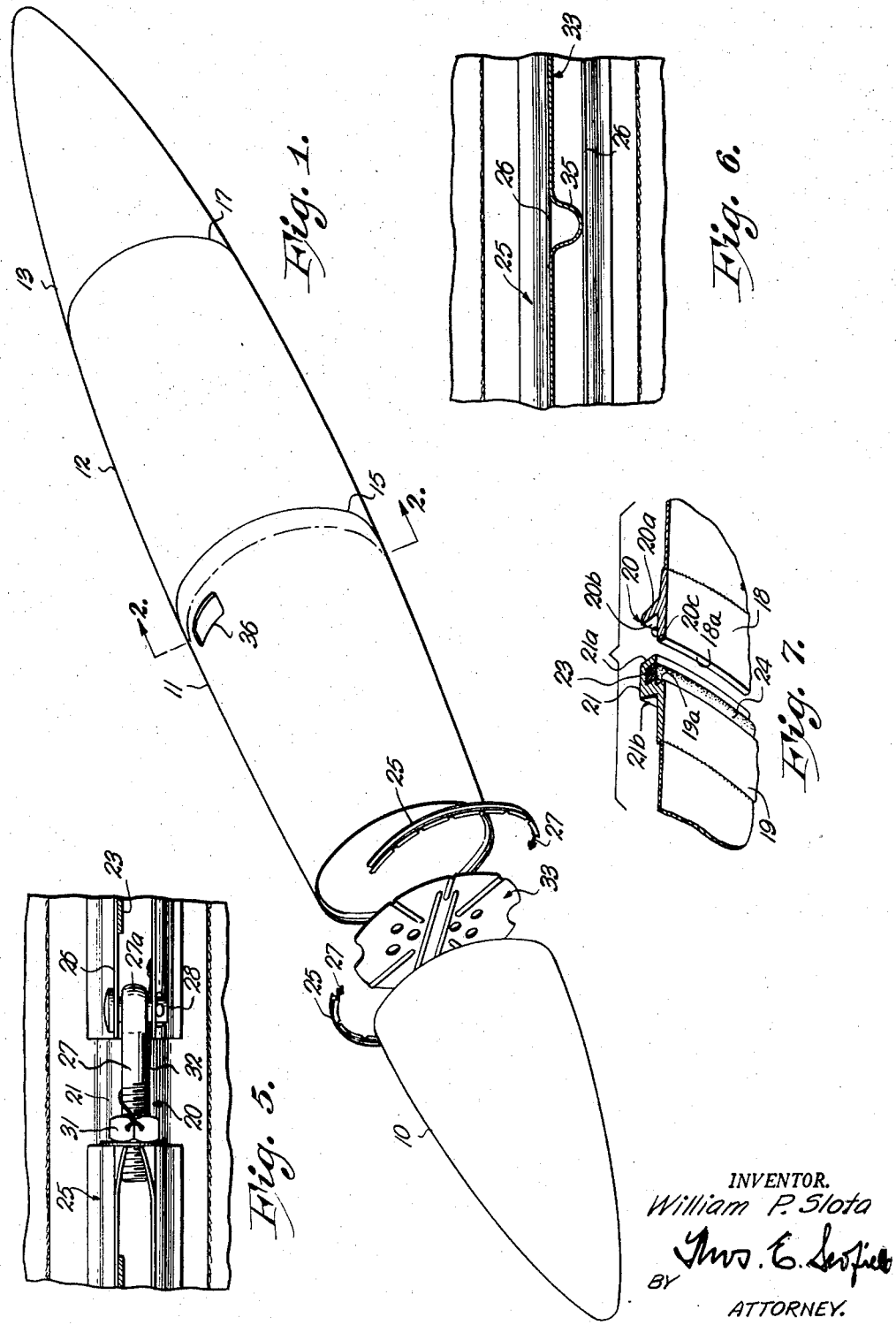
INVENTOR.
William P. Slota
BY
ATTORNEY.

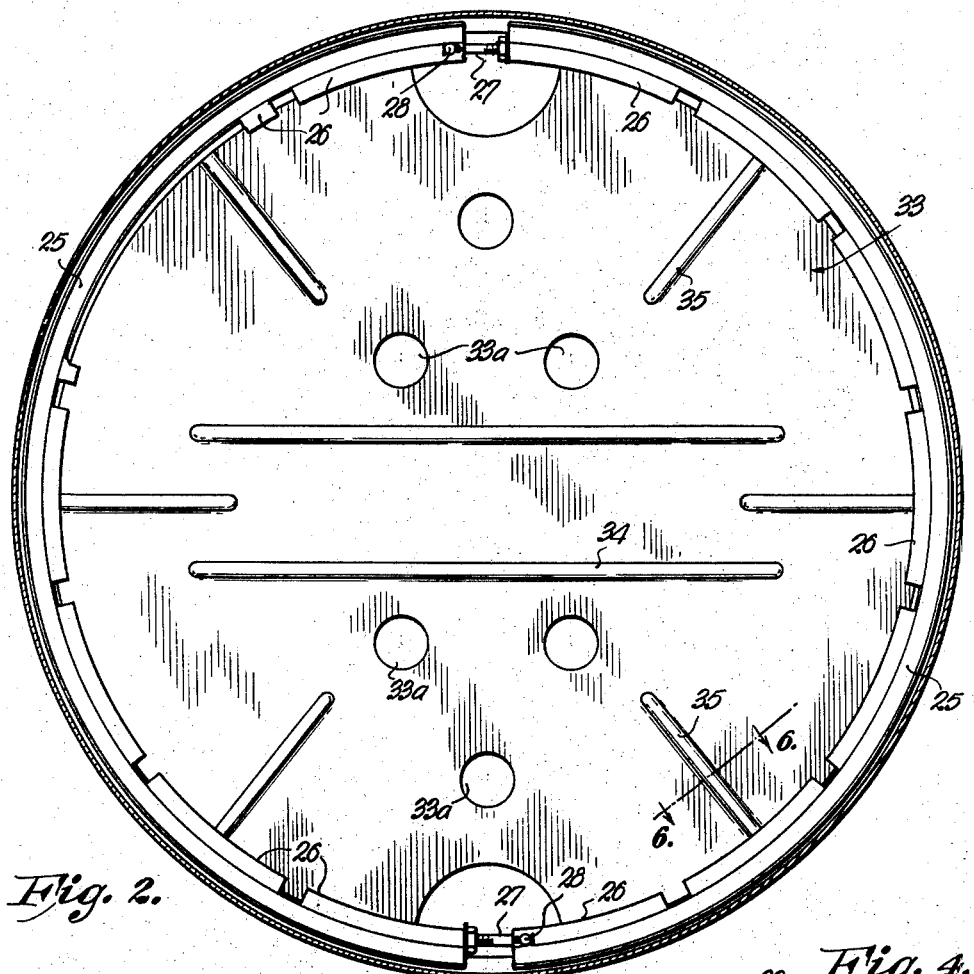
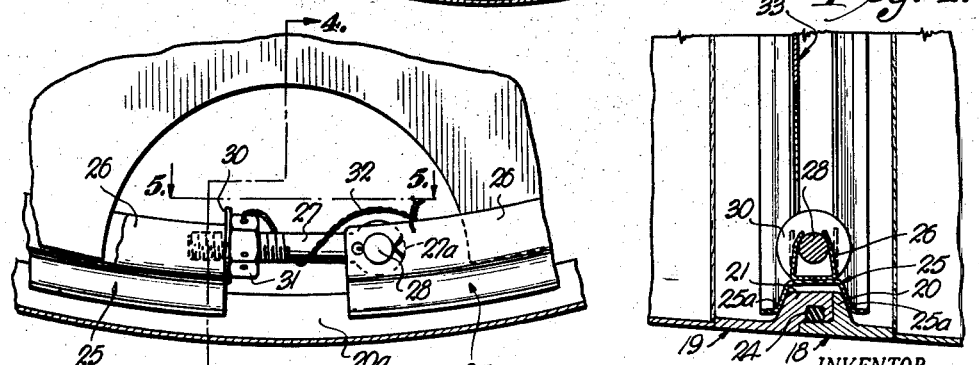

United States Patent Office 2,947,440
Patented Aug. 2, 1960

2,947,440

SECTIONAL CONTAINERS AND THE LIKE

William P. Slota, Reseda, Calif., assignor to Benson Manufacturing Company, a corporation of Missouri Filed Oct. 2, 1957, Ser. No. 687,680

3 Claims. (Cl. 220—22)

This invention relates in general to containers and the like and refers more particularly to structure having special advantage in the construction of jettisonable fuel tanks of the type adapted for temporary attachment to aircraft to increase their flying range.

As is known, fuel tanks of the character described are streamlined shells adapted for mounting on the exterior of the aircraft, for example on the underside of the wings at the tips or beneath the fuselage. Since in the course of operation such tanks are jettisoned as their contents are exhausted, large numbers of replacement tanks are required at the air field on which the flights originate. To save space during both shipment and storage the tanks are commonly constructed in sections and are shipped in knocked down form with the sections nested within one another. To provide the nesting feature the tank sections, or certain ones of them, are tapered end to end so that smaller sections can be fitted inside the larger ones to form a compact package.

One of the factors which has long plagued designers in the obtaining of a favorable "nesting ratio" (number of nested tanks which can be fitted into the volume occupied by one assembled tank) is that the parts which form the means of attaching the sections together extend inwardly sufficiently far as to materially reduce the inside diameter available for nesting. This of course can be eliminated by providing an outside connection, but outside connections are highly undesirable due to the increase in drag which inevitably results, and the interference with smooth air flow over the tank. One of the objects of the present invention is to provide an inside connecting joint which is extremely thin and which enables the attainment of nesting ratios in the vicinity of 10:1.

Another object of the invention is to provide a tank in which the joints are such that the sections can be assembled with much greater ease and rapidity than is possible with presently known units.

A further object of the invention is to provide a tank in which the joints, when assembled, are fluid tight and will remain so under the severe conditions of acceleration, vibration and strain encountered in the flight of the aircraft. A feature of the invention in this respect resides in the manner in which a resilient sealing ring is connected in sealing position in the joint. Through my invention the danger of leakage due to exceeding manufacturing tolerances is avoided as is also the problem of maintaining the ring in proper position during assembly of the tank.

A further object of the invention is to provide a tank joint of the character described in which the joint is maintained closed by means of a substantially continuous wedging member which extends around the circumference of the tank at the joint. This eliminates the danger of gaps and points of extreme stress concentration sometimes encountered in bolted flange connections.

Still another object of the invention is to provide a tank which can be manufactured at relatively low cost, which is simple and easy to assemble, and which is capable of withstanding rugged use.

Other and further objects of the invention together with the features of novelty appurtenant thereto will appear in the course of the following description.

In the accompanying drawings, which form a part of the instant specification and are to be read in conjunction therewith and in which like reference numerals indicate like parts in the various views;

Fig. 1 is a perspective view of a typical tank embodying the invention, one end section being shown separated from the remainder of the tank and the parts of the joint being shown in exploded relation;

Fig. 2 is a transverse section through the tank adjacent to a typical joint such as along the line 2—2 of Fig. 1 in the direction of the arrows.

Fig. 3 is an enlarged fragmentary view of the bottom of Fig. 2 showing the details of the preferred expansion means;

Fig. 4 is a view taken along the lines 4—4 of Fig. 3 in the direction of the arrows;

Fig. 5 is a view taken generally along the line 5—5 of Fig. 3 in the direction of the arrows;

Fig. 6 is an enlarged view taken along the line 6—6 of Fig. 2 in the direction of the arrows; and Fig. 7 is a fragmentary perspective and partly sectional view showing a pair of tank sections slightly separated from one another and illustrating the interlocking telescopic arrangement.

Referring to the drawings, for purposes of illustrating my invention I have shown in Fig. 1 a typical tank of streamlined construction, the tank in this case being made up of four coaxial sections 10, 11, 12 and 13 fastened end to end. The end section 10 is shown as separated from its adjacent section 11 to make more apparent the construction of the joint. It will be understood that joints 15 and 17 of the tank will be the same as the one joint now to be described in detail. It will also be understood that normally such tanks are equipped with attaching pylons and remote control detaching mechanism. However, since these latter features play no part in my invention, I have foregone including them in the drawings and description.

The shell sections are of the usual thin wall construction. As will be apparent from Figs. 1 and 7, provided on the adjoining ends of the respective shell sections are annular extension members 18 and 19. These extensions may be extruded aluminum elements curved to conform to the outline of the shell and welded or otherwise firmly secured to the shell skin. Care should be taken to make their outer surface a smooth continuation of the outer shell surface.

The extension 18 is provided with an inwardly extending annular flange 20 having a tapered outside face 20a and a flat inner face 20b, preferably normal to the axis of the tank. Face 20b forms one wall of a continuous annular rabbeted recess or groove, the recess having the base 20c.

Adapted to fit telescopically with the L-shaped recess in extension 18 is the offset annular lug or tongue 21 on extension 19. Lug 21 has an annular end face 21a which, when the lug is telescopically mated with the recess, butts against the flat face 20b of extension 19, and an outside face 21b which is tapered opposite to face 20a of flange 20. Formed in the outside wall of lug 21 is a concentric annular groove 23 whose open end is covered by the base 20c of the recess when the parts are mated as shown in Fig. 4. The length in an axial direction of lug 21 and recess face 20c is such that there may be a slight separation of the end face 21a of lug 21 from the face 20b without uncovering the groove. Also, the lug is of such length, that its end face 21a will come into bearing contact with the face 20b before any contact is established between the ends 18a and 19a, respectively, of the extensions.

Positioned in groove 23 is a continuous elastic ring 24 of suitable sealing material such as synthetic rubber. In its normal uncompressed condition ring 24 projects slightly beyond the outside wall of lug 21 so that when the lug moves into the recess as the parts are mated the material of the ring will be compressed to establish a liquid tight seal. The groove must, of course, be so dimensioned as to accommodate inwardly displaced material of the ring as the plastic deformation takes place during mating.

It is important to note that accidental displacement of the sealing ring 24 from its groove, once the ring is installed therein, is virtually impossible. The ring is snapped into the groove much like a rubber band would be, and the side walls of the groove thereafter prevent it from slipping off the lug 21. Thus, there is little if any danger of the ring being disoriented from its proper position during assembly. This provides a distinct advantage over arrangements wherein the sealing ring is disposed to seal between surfaces in planes normal to the tank axis.

When the extensions 18 and 19 are brought telescopically together in the fashion described, the lug 21 and flange 20 cooperate to form what may be termed a continuous solid annular rib extending circumferentially around the inside of the tank. The opposed faces of this rib are formed by tapered face 20a of the flange and tapered face 21b of the lug.

The joint is secured by means of a channel-like expandable shoe which is disposed within the tank and which in its preferred form comprises two substantially semi-circular segments 25. The legs 25a of the segments are adapted to fit over the rib and engage with the tapered faces 20a and 21b of the rib. In Fig. 1 the segments of the shoe are shown disconnected. As will later be described, however, in actual practice they are connected by an expansion means through the operation of which they can be displaced away from one another, thus to impel them over and into tight gripping engagement relative to the rib.

Each section 25 of the shoe is formed as a tapered channel having a curved web, the curvature of the web conforming substantially to the curvature of the aforementioned rib on the inside of the joint. The inside dimensions of the channel are such that when the channel is positioned on the rib it will make firm contact at its legs with the tapered faces of the rib at a point at which the web of the channel is displaced slightly from the confronting face of the rib. To add strength to the channel the legs thereof are outturned at the ends as best shown in Fig. 4.

The length of each of the sections 25 of the clamping shoe is such that they may be loosely installed on the rib with their ends slightly separated.

Mounted web to web on the shoe sections 25 are short lengths 26 of inverted channel, that is, which open inwardly toward the center of the tank. Secured to one of the endmost channel lengths on each section 25 is an expansion bolt 27. This bolt is preferably in the form of an eye bolt, the eye 27a being positioned between the legs of the channel and a locking pin 28 extending through the eye as shown in Figs. 4 and 5. This locking pin is received in apertures in the opposite legs of the channel and has an enlarged head 28a on one side and an aperture for a cotter key 29 at the other, thus to secure the cross pin in place. The free end of bolt 27 is inserted into the end channel on the adjacent section 25. Provided on this bolt is a washer 30 of a size to bear against the end of the channel, and a nut 31. It will be evident that by threading nut 31 outwardly on the bolt, the shoe sections 25 will be separated from one another and forced outwardly into tight gripping relationship with the rib of the joint. A locking wire 32 is preferably connected with the nut when expansion has been completed in order to prevent unthreading of the nut. Also, the legs of the channel in which the free end of the bolt 27 is received should, prior to insertion of the bolt, be crimped together as shown in Fig. 4 to prevent pivoting of the nut out of the expanding position. This crimping can be accomplished with any type of suitable tool, for example, pliers.

It will be observed that in addition to the channels at the ends of the shoe sections 25 there are a plurality of similar lengths distributed uniformly therealong. These, in combination with the end channels, form the mounting for a surge baffle 33 which, in the preferred form, is a circular, rather disk-like member having gasoline communicating apertures 33a and strengthening ribs 34 and 35. Ribs 35 are formed as deformations in the baffle sheet and are directed radially toward and terminate at the edge of the sheet. As shown in Figs. 2 and 6 the rim of the baffle is received in the trough formed by the short lengths of channel 26. Vibration of the baffle is resisted by the ribs 35 which are received in the channels and are of substantially equal depth with the width of the channels (see Fig. 6).

Care must be taken to give the baffle a diameter which will permit preliminary positioning of the shoe sections on the rib of the joint during assembly. In other words, it must be of lesser diameter than the expanded diameter of the shoe sections.

The manner of assembling a complete tank is as follows. First the nose and tail sections 10 and 13 would be joined to their adjacent central sections 11 and 12 by working through the open ends of the respective central sections. The center joint, that is, the one between the sections 11 and 12, is then made by working through the filler opening 36 of the tank.

While I have shown two shoe sections 25 as forming a complete joint, it will be evident that the results desired can be accomplished with four or with any other number so long as the necessary expansion means is supplied.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a knock-down tank composed of at least two annular shell sections disposed end to end, a sealed connecting joint for the adjoining ends comprising a first annular extension on one of said ends having formed therein an inwardly open annular recess, a second extension on the other of said ends having a complementary lug portion adapted to telescopically mate with said recess as said ends are advanced axially toward one another, said extensions together forming an inwardly projecting rib circumscribing the inside of the tank with one side of the rib provided by said first extension and the other side by said second extension, a channel-like clamping ring extending around the inside of said shells with the legs thereof on opposite sides of said rib, means connected with said channel inside the shells for expanding the diameter of the clamping ring thus to firmly clamp said rib between the legs of the channel to prevent axial separation of the shell sections, inwardly open second channel segments secured to the clamping ring and forming together inwardly open trough portions cooperating to circumscribe the inside of the clamping ring, and a circular plate-like baffle member having its rim located in said trough whereby said baffle is held against axial displacement in the tank, the diameter of the baffle being less than the expanded inside diameter of the clamping ring whereby to permit preliminary positioning of the clamping ring on the rib before expansion of the ring.

2. In a knock-down tank composed of at least two annular shell sections disposed end to end, a sealed connecting joint for the adjoining ends comprising a first annular extension on one of said ends having formed therein an inwardly open annular recess, a second extension on the other of said ends having a complementary lug portion adapted to telescopically mate with said recess as said ends are advanced axially toward one another, said extensions together forming an inwardly projecting rib circumscribing the inside of the tank with one side of the rib provided by said first extension and the other side by said second extension, a channel-like clamping ring extending around the inside of said shells with the legs thereof on opposite sides of said rib, said ring being separated at at least on point to present confronting end portions, a bolt member piovtally connected with one of said end portions and swingable from an essentially radial position relative to the ring to a position in which a part of the bolt overlies said other portion, a bolt guide on said other portion in which said bolt is received, said guide including spaced portions permitting entry of the bolt therebetween but deformable to a position confining said bolt against pivotal movement back away from said other portion, and an expansion nut threaded on said bolt and bearing against said guide whereby to expand the diameter of said ring as the nut is advanced toward said other end portion.

3. In a tank comprising a hollow cylindrical shell, the combination of a circular baffle member disposed inside of and partitioning the shell, an expandable ring circumscribing the baffle and having spaced parallel baffle member engaging elements disposed on opposite sides of the baffle member and confining same against axial separation from the ring, structure on the inside of the shell positioned to be engaged by and to index the ring in the shell when the ring is expanded, the diameter of the baffle member being sufficiently less than that of the ring when the ring is expanded as to permit the ring and baffle member to be initially positioned with a portion of the ring adjacent but spaced inwardly of said structure, and means operable to expand the ring to engage it with said structure.

References Cited in the file of this patent

UNITED STATES PATENTS

| | | |
|---|---|---|
| 572,471 | Burnham | Dec. 1, 1896 |
| 831,551 | Buttzeit | Sept. 25, 1906 |
| 1,959,191 | Acly | May 15, 1934 |
| 2,477,512 | Dunneback | July 26, 1949 |
| 2,597,482 | Harrison et al. | May 20, 1952 |
| 2,793,779 | Woods | May 28, 1957 |
| 2,804,559 | Brewer | Aug. 27, 1957 |
| 2,829,793 | Baumann | Apr. 8, 1958 |